United States Patent Office 3,106,538  
Patented Oct. 8, 1963

3,106,538  
MONO-GLYCERIDE-BENZENE TRICARBOXYLIC ACID SMEAR RESISTANT WAXY RESIN  
Ronald L. Broadhead, Park Forest, Ill., assignor to Standard Oil Company, Chicago, Ill., a corporation of Indiana  
No Drawing. Filed Sept. 25, 1959, Ser. No. 842,226  
3 Claims. (Cl. 260—22)

This invention relates to resins possessing waxy properties and particularly waxy resins having dry-bright and smear resistance when applied as a surface coating to wood finishes.

An object of the invention is a resinous solid having waxy properties. Another object is a resinous solid capable of forming from solution a wear resistant surface coating. Yet another object is a resinous solid capable of forming from solution dry-bright surface coatings. Still another object is a resinous solid capable of forming from solution dry-bright surface coatings which coatings are smear-resistant. A further object is a resinous solid capable of forming from solution dry-bright surface coatings which have a high degree of water repellency. A still further object is a resinous solid capable of forming from solution a dry-bright surface coating which has no substantial dust-pickup tendency.

A desired object is a resinous solid capable of forming from solution a surface coating on a wooden object, which object can be varnished without first removing said coating. Other objects will become apparent in the course of the detailed description of the invention.

One or more or all of the above objects—not possible of achievement by present commercial wax polishes—are attained from the polyesterification-condensation reaction resin product of a benzene tricarboxylic acid or anhydride thereof and a monoglyceride of a saturated fatty acid having from at least 18 to about 30 carbon atoms, reacted in a mole ratio from about 1:1.5 to about 1:2.1, respectively, which resin has an acid number (mg. KOH per g. of solid) of not more than 20. Introduction in the above reaction system of succinic anhydride or a $C_2$-$C_6$ alkanediol—as hereinafter described—permits a still wider range of utility for these waxy resins.

The acidic reactant is a benzene tricarboxylic acid or an anhydride thereof—only carboxyl (and anhydride) groups are present. These are trimellitic acid, trimellitic anhydride, trimesic acid, hemimellitic acid and hemimillitic anhydride.

The glyceride reactant is a monoglyceride of a saturated fatty acid containing from at least 18 to about 30 carbon atoms. Illustrations of suitable fatty acid are stearic, nonadecanoic, arachidic, lignoceric, montanic, dotriacontanoic, dimethyloctadecanoic and ethyldocosanoic. Commercially available distilled monostearin is a particularly suitable monoglyceride.

The acidic reactant and monoglyceride are introduced in the reaction zone in a mole ratio of acidic reactant to monoglyceride of form about 1:1.3 to about 1:2.1. It is preferred to use a ratio from about 1:1.9 to about 1:2.0.

The reaction is carried out under more or less conventional conditions for polyesterification-condensation reactions. The reaction zone is vigorously agitated to improve contacting while the temperature is maintained between about 125° C. and 225° C., commonly on the order of 170° C. Water produced in the reaction is continuously withdrawn. The time of reaction is determined by the type of reactants and the temperature of reaction; the waxy solid resin product has an acid number of not more than 20.

The resin obtained from the above condensation reaction is a waxy solid with, usually, a glossy surface. These waxy resins are very soluble in hydrocarbons which are solvents for natural waxes and solid paraffins. Examples of these solvents are naphtha, benzene, mineral spirits and toluene. These resins also have a large solubility in alcohols such as isopropanol.

Application of a thin film of a hydrocarbon solution of these resins on a surface such as wood results on vaporization of the solvent in a surface coating ranging from a dull-lustre to a bright gloss, without buffing or rubbing of the coating. All these resin surface coatings can be rubbed or buffed into hard, glossy surfaces. All of these coatings are very resistant to smearing from hand pressure. The better dry-bright surface coatings are as good as the coatings produced by buffing application of commercial wax polishes. In smear resistance, these surface coatings are far superior to those produced from commercial waxes available today.

The surface coatings from a particular resin formed from alcohol solution do not, in general, equal the gloss—dry-bright—of the surface coatings formed from hydrocarbon solution. A light buffing produces an equally bright, hard surface.

The dry-bright gloss of the surface coating formed from alcohol solution can be improved to compete with that from hydrocarbon solution by incorporating some succinic anhydrides as a modified in the reaction. The mole ratio of acidic member:monoglyceride:succinic anhydride used in this modified operation is from about 1.5:3:0.3 and about 1:3:1. The resin product of these reactants has an acid number of not more than about 50.

Another modified resin is obtained by using an alkanediol containing from 2 to 6 carbon atoms along with the acidic reactant and monoglyceride. Particularly good resins are obtained when using neopentyl glycol or 1,4-butanediol. The mole ratio of acidic member:monoglyceride:alkanediol used in this modification is from about 1:1:0.5 to about 1:2:1. The resin product of these reactants has an acid number of not more than about 75.

The resins of the invention are illustrated by the following working examples. It is to be understood that these are merely specific species and are not to be construed as limiting the scope of the claims.

*Example 1*

71.7 grams (0.2 mole) of glyceryl monostearate and 28.8 grams (0.15 mole) of trimellitic anhydride were agitated in a flask for about 5 hours at a temperature ranging from 165° C. to 190° C. The contents of the flask changed from a slurry of anhydride particles in the monoglyceride to a viscous liquid. At room temperature the resin product was a hard, waxy, tan-colored solid.

A. 5.0 g. of the resin were dissolved in 45 g. of mineral spirits—a hydrocarbon having an ASTM distillation range of 307° F.–397° F. (153° C.–203° C.), a flash point of 104° F. and a kauri-butanol No. of 36.5. A clear solution was obtained at room temperature. Surface coatings from this solution were formed on both wood and metal surfaces; a very light rubbing produced glossy, smear-free surfaces.

B. 5.0 g. of this resin were dissolved in 45 g. of hot isopropanol. This solution changed to a soft paste at room temperature. The soft paste afforded, after light rubbing, hard, glossy, smear-free surface coatings when applied to wood, metal, asphalt tile and rubber tile surfaces.

C. 10 g. of this resin and 3 g. of 150° F. M.P. paraffin wax were blended together to form a compatible solid. The solid was dissolved in 37 g. of hot mineral spirits; a dispersion of solid particles in mineral spirits was obtained on cooling to room temperature. The dispersion was extremely suitable for use as a wax polish for surfaces.

Example 2

Trimellitic anhydride and commercial distilled monostearin were reacted in a mole ration of 1:2 with vigorous stirring. The condensation reaction was carried out at a temperature of 170–175° C. for a time of 5 hours. The resin product was a hard, glossy, waxy resin having a melting range of 64–79° C. and an acid number of 14.9. A surface coating on wood formed from an 18% mineral spirits solution was dry-bright, hard and smear-resistant to hand pressure. Additionally this surface coating showed no water spotting and had essentially no tendency to pick-up dust. A dusty surface retained its high gloss when the dust was wiped off with a cloth.

Example 3

A resin was prepared by condensing trimellitic anhydride, distilled monostearin and succinic anhydride in a mole ratio of 1:3:1, at a temperature of 170–175° C. for 6½ hours. The waxy resin product had an acid number of 37.8. A surface coating on wood formed from a 20% mineral spirits solution was dry-bright; however, the gloss improved with rubbing and was better than that of other waxy resins included within this invention. A surface coating on wood formed from an 18% isopropanol solution was dry-bright.

Example 4

A resin was prepared by condensing trimellitic anhydride, distilled monostearin and neopentyl glycol in a mole ratio of 1:1.3:0.5, at a temperature of 170–175° C. The waxy resin product had an acid number of 64.5. A surface coating on wood formed from an 18% mineral spirits solution was dry-bright.

In addition to their other outstanding properties, the surface coatings from these waxy resins can be varnished over as is, i.e., the waxy resin coating does not have to be removed in order to obtain an adherent varnish coating.

Thus having described the invention, what is claimed is:

1. A solid resin possessing waxy properties prepared by condensing (a) an acidic member selected from the class consisting of trimesic acid, trimellitic acid, trimellitic anhydride, hemimellitic acid and hemimellitic anhydride, (b) a monoglyceride of a saturated fatty acid containing from at least 18 to about 30 carbon atoms, and (c) succinic anhydride, in a mole ratio of said $a:b:c$ from about 1.5:3:0.3 to about 1:3:1, at a temperature between about 125° C. and about 225° C., with continuous withdrawal of water of reaction, until said condensation is essentially complete, to obtain a solid resin possessing waxy properties having an acid number of not more than about 50.

2. A waxy solid resin prepared by condensing (a) trimellitic anhydride, (b) distilled monostearin, and (c) succinic anhydride, in a mole ratio of $a:b:c$ of about 1:3:1, at a temperature on the order of 170° C., with continuous withdrawal of water of reaction, for a time on the order of 6 hours, to obtain a waxy solid resin having an acid number of about 38.

3. A resin with waxy properties prepared by condensing trimellitic anhydride, distilled monostearin and neopentyl glycol, in a mole ratio of about 1:1.2:0.5, at a temperature on the order of 170° C., with continuous withdrawal of water of reaction until said condensation is essentially complete to obtain a solid resin possessing waxy properties and having an acid number of about 65.

References Cited in the file of this patent
UNITED STATES PATENTS

| | | |
|---|---|---|
| 2,856,374 | Bolton | Oct. 14, 1958 |
| 2,870,102 | Van Strien | Jan. 20, 1959 |
| 2,985,603 | Van Strien et al. | May 23, 1961 |
| 2,991,259 | Carlston | July 4, 1961 |

UNITED STATES PATENT OFFICE
CERTIFICATE OF CORRECTION

Patent No. 3,106,538                                             October 8, 1963

Ronald L. Broadhead

It is hereby certified that error appears in the above numbered patent requiring correction and that the said Letters Patent should read as corrected below.

Column 1, line 58, for "form" read -- from --; column 2, line 26, for "anhydrides as a modified" read -- anhydride as a modifier --; column 3, line 2, for "ration" read -- ratio --.

Signed and sealed this 7th day of April 1964.

(SEAL)
Attest:
ERNEST W. SWIDER

Attesting Officer

EDWARD J. BRENNER

Commissioner of Patents